E. FAIRWEATHER.
YIELDABLE CHANGE SPEED GEARING.
APPLICATION FILED NOV. 17, 1917.
1,275,885.                                    Patented Aug. 13, 1918.
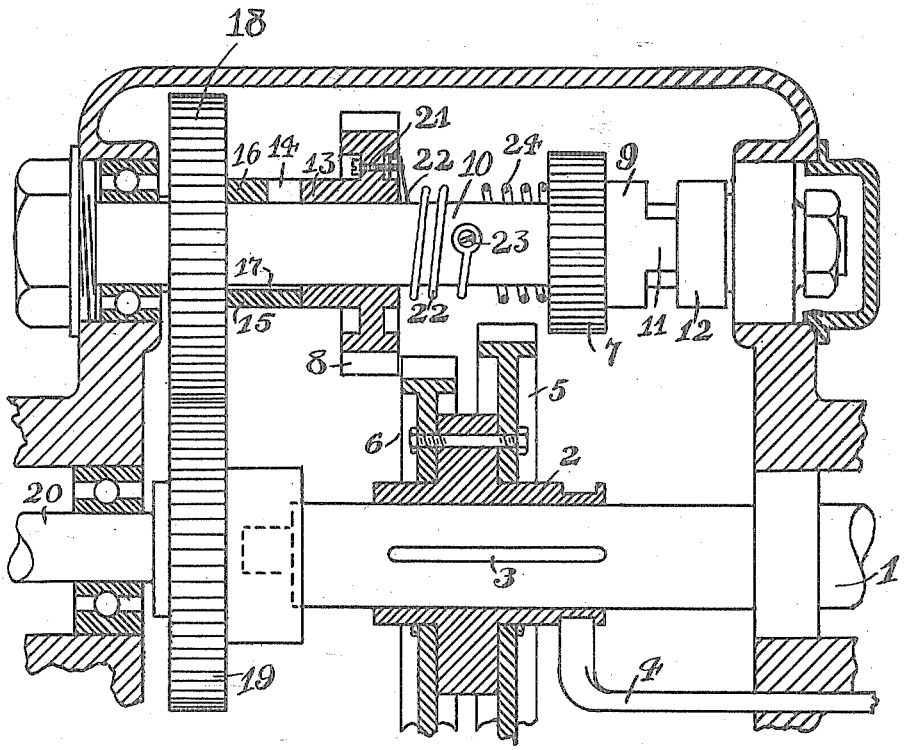
Fig. 1.
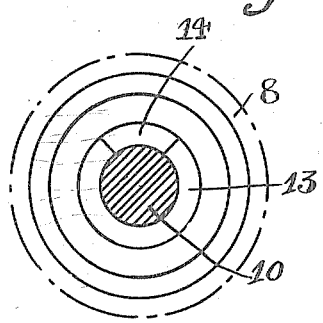   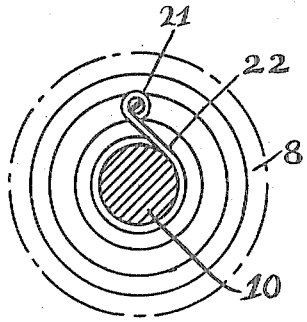
Fig. 2.        Fig. 3.
Witnesses                         Inventor
                              Edgar Fairweather
                              Attorneys.

UNITED STATES PATENT OFFICE.

EDGAR FAIRWEATHER, OF LONDON, ENGLAND.

YIELDABLE CHANGE-SPEED GEARING.

1,275,885. Specification of Letters Patent. Patented Aug. 13, 1918.

Application filed November 17, 1917. Serial No. 202,572.

*To all whom it may concern:*

Be it known that I, EDGAR FAIRWEATHER, a subject of the King of Great Britain, residing at London, in the county of Middlesex and Kingdom of England, have invented certain new and useful Improvements in and Relating to Yieldable Change-Speed Gearing, of which the following is a specification.

The present invention relates to improvements in variable gear power transmission arrangements, more particularly applicable to pinion gearing of the type in which a spring shock absorber is inserted between a driving and a driven shaft.

The transmission apparatus of the present invention is directly applicable to gear boxes of automobiles or the like, but can obviously be applied to any arrangement where variable transmission of power is desired, such as for instance machine tools.

According to the present invention, one or more of the gear wheels or pinions of a power transmission gear is integral with a member of a dog clutch and is free to rotate on its shaft in its own plane for a substantial part of a revolution in either direction against spring pressure to then engage with the corresponding member of the dog clutch which will be fixed to the shaft.

In the drawings:—

Figure 1 is a part cross sectional elevation of a two-speed gear box;

Fig. 2 is a view on one side of one of the gear wheels; while

Fig. 3 is a view on the other side of the same gear wheel.

The driving shaft 1 carries a sleeve 2 capable of sliding axially along the shaft 1 on a key-way 3 but rotating with it. The sleeve 2 may be shifted axially along the shaft 1 by means of an operating fork 4 of usual type.

The sleeve 2 carries a pair of pinions 5, 6, of different diameters adapted to engage respectively with a pair of pinions 7, 8, the diameters of which are inversely proportional to the diameters of the wheels 5, 6, and in any desired predetermined ratio.

The pinion 7 is mounted on a sleeve 9 keyed on the lay shaft 10. This sleeve carries a jaw 11, adapted to engage against a corresponding jaw on a sleeve 12 keyed to the shaft 10; similarly the gear wheel 8 is integral with a sleeve 13 having a jaw 14 which is adapted to engage against a corresponding jaw 15 on a sleeve 16, secured to the shaft 10 by means of a key 17. The shaft 10 has also keyed to it a pinion 18 in constant engagement with the pinion 19 on the driven shaft 20.

The pinion 8 is attached by means of a bolt 21 to one end of a coil spring 22 encircling the shaft 10, the other end of which spring 22 is secured at 23 to the shaft 10. The pinion 7 has a spring 24 connected to it in similar manner, and this spring 24 is also connected at its outer end to the shaft 10 similarly to the spring 22.

It will now be seen that if a gear is engaged by displacing the sleeve 2 either to the left or to the right, then a pair of pinions on the shafts 1 and 10 will be engaged while the pinion on the shaft 10 will turn for a considerable portion of a revolution without resistance beyond the torsional resistance of the spring 24, until the dog for instance 14 on the pinion 8 comes into driving engagement with the dog 15 on the shaft 10, and then the drive is rigid from the shaft 1 through for instance the pinion 6, pinion 8, dog 14, dog 15, pinion 18, pinion 19, to the shaft 20.

This arrangement insures that the gears are engaged without "clash" or noise.

It is preferred that the spring should hold the gear wheel in a position with its dog midway on either side of the corresponding dog on the shaft 10.

I declare that what I claim is:—

A yieldable change speed gearing comprising a shaft, a single clutch dog on said shaft, a gear wheel loose on said shaft, a single clutch dog on said gear wheel, a helical spring surrounding said shaft attached at one end to said shaft, and at the other end to said gear wheel to maintain the single clutch dog upon it in a position midway between either side of the clutch dog on the shaft to allow substantially a complete relative movement of the gear wheel to the shaft.

In witness whereof, I have hereunto signed my name this 24th day of October, 1917, in the presence of two subscribing witnesses.

EDGAR FAIRWEATHER.

Witnesses:
 ERNEST H. ROBERTS,
 GEO. D. S. KELSEY.